C. ENDORF, Jr.
SELF CONTAINED MOTOR AND SPEED CONTROL FOR VIBRATORS.
APPLICATION FILED JULY 1, 1916.
1,323,622.
Patented Dec. 2, 1919.
2 SHEETS—SHEET 1.
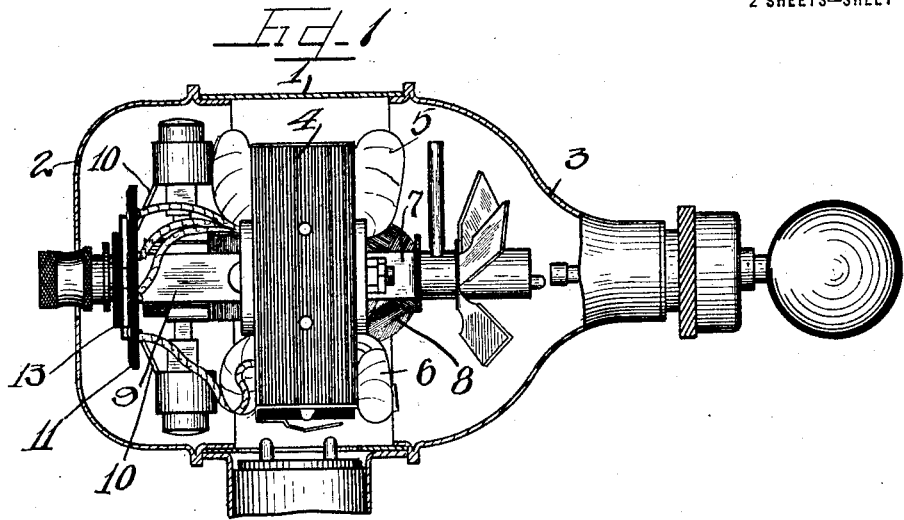
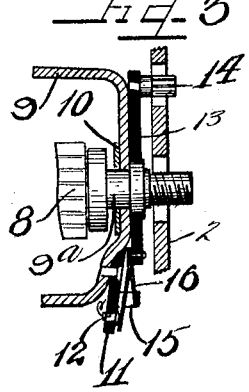
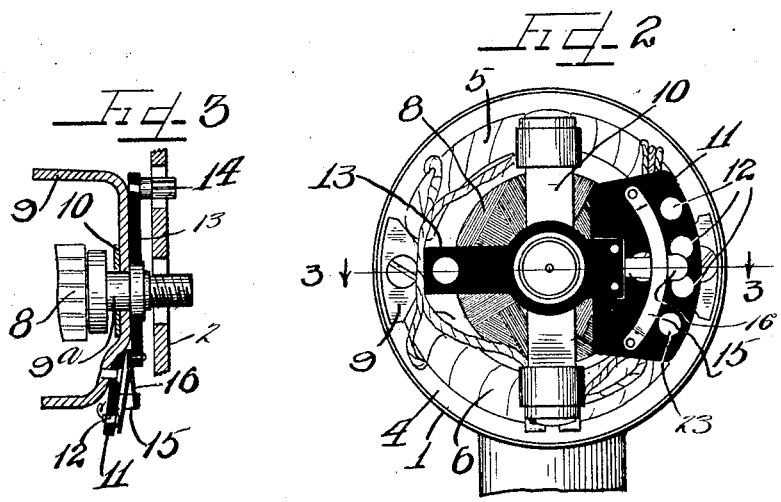

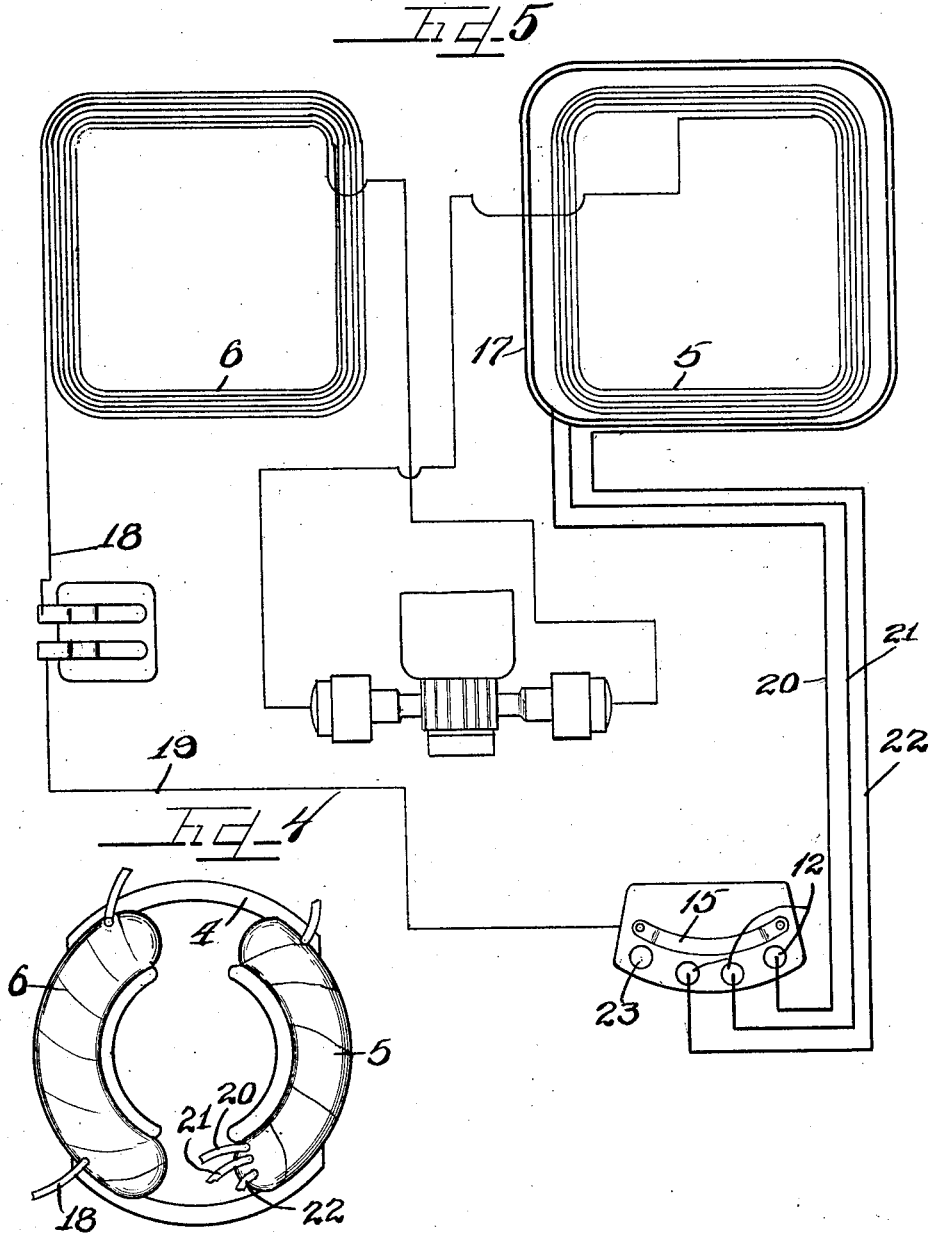

UNITED STATES PATENT OFFICE.

CHARLES ENDORF, JR., OF CHICAGO, ILLINOIS, ASSIGNOR TO LINDSTROM, SMITH COMPANY, OF CHICAGO, ILLINOIS, A CORPORATION OF ILLINOIS.

SELF-CONTAINED MOTOR AND SPEED CONTROL FOR VIBRATORS.

1,323,622. Specification of Letters Patent. Patented Dec. 2, 1919.

Application filed July 1, 1916. Serial No. 107,072.

*To all whom it may concern:*

Be it known that I, CHARLES ENDORF, Jr., a citizen of the United States, and a resident of the city of Chicago, in the county of Cook and State of Illinois, have invented certain new and useful Improvements in Self-Contained Motors and Speed Controls for Vibrators; and I do hereby declare that the following is a full, clear, and exact description of the same, reference being had to the accompanying drawings, and to the numerals of reference marked thereon, which form a part of this specification.

This invention relates to an improved type of motor provided with a resistance in series therewith to control variations in speed of the motor and with the parts self contained and assembled in a novel manner wherein the resistance coils are wound about the field poles with the field coils and the resistance mounted within the casing of the motor at the commutator end thereof, and with the switch arm journaled upon the armature shaft to afford an exceedingly compact and easily operated device.

It is an object therefore of this invention to construct a motor provided with resistance coils disposed within the interior of the motor and with the rheostat switch for said coils disposed within the casing of the motor mounted on the frame thereof with the switch arm journaled co-axial with the armature shaft of the motor.

It is also an object of this invention to provide a vibrator motor construction embracing a motor, its brush, and rheostatic control entirely incased, with the resistance coils of the rheostat wound with the field coils and the switch mechanism for said rheostat coils mounted in a convenient position to utilize the armature shaft as a pivot for the switch arm within the casing of the motor.

It is furthermore an important object of this invention to construct a self-contained type of vibrator motor of variable speed provided with resistance coils in series with the motor and wound about one of the poles thereof, and with the switch for said coils conveniently mounted within the casing of the motor at one end thereof and actuatable from the exterior of said casing.

It is finally an object of this invention to construct an improved type of variable speed motor with resistance means and switch mechanism therefor mounted within the casing of the motor and conveniently actuatable on the exterior of the casing of the motor.

The invention (in a preferred form) is illustrated in the drawings and hereinafter more fully described.

In the drawings:

Figure 1 is a central vertical section taken through the casing of a motor showing the motor in elevation on the interior thereof.

Fig. 2 is an end view of the motor with the end cover of the casing detached.

Fig. 3 is a fragmentary detail section taken on line 3—3 of Fig. 2, with parts shown in elevation.

Fig. 4 is a fragmentary detail view of the field coils showing the terminals of the resistance coils leading therefrom.

Fig. 5 is a wiring diagram of the motor.

As shown in the drawings:

The motor is mounted within a casing consisting of a central cylindrical section 1, a curved end section 2, and another end section 3, of bell shape. Rigidly mounted within the central cylindrical section 1, is a laminated frame or pole core 4, on which the field coils denoted as a whole by the reference numerals 5 and 6, are wound. Bolted on one end of the laminated frame 4, is a bracket bearing 7, affording a bearing for one end of the shaft of an armature 8, and bolted on the other end of said laminated frame 4, is a bracket 9, provided with a bearing bushing $9^a$, shown in detail in Figs. 2 and 3, said bushing $9^a$, affording a bearing for the other end of the armature shaft. Said bearing bracket 9, and bushing $9^a$, also afford a support for brush arms 10, which consist of an integral strip of metal centrally apertured and pivoted upon said bushing $9^a$.

Secured upon one side of the armature shaft on the bearing bracket 9, is an insulating plate 11, provided with a plurality of terminal contacts 12, and journaled on the bushing into which the armature shaft extends, flat against the bearing bracket 9, is an insulating switch arm 13, provided with a metal actuating finger piece 14, which projects through a slot provided therefor in the casing section 2. A long curved flat contact member 15, is secured upon said insulating plate 11, and said insulating arm 13, is provided with a resilient conductor strip 16, so bent that one portion thereof bears at all times on the under surface of said contact member 15, and the other portion is adapted to contact any one of the terminal contacts 12, to establish a circuit between contact member 15, and a contact 12.

The resistance coils shown in the wiring diagram in heavy lines are disposed on the exterior of one of the field coils and denoted as a whole by the reference numeral 17, and are connected in series with said field pole winding which is in turn connected in series to one brush of the motor with the armature winding connected through the other brush in series with the other field pole winding. The main line leads are denoted by the reference numerals 18, and 19, the lead 18, leading directly to one of the field coils, and the lead 19, leading to the switch contact member 15. Three wires denoted respectively by the reference numerals 20, 21 and 22, are connected to three of the terminals of the insulating plate 11, and to two resistance coils 17, which are in series so that either one, both or neither of said coils may be brought into circuit to form a speed controlling resistance for the motor. A dead terminal 23, is provided on said insulating plate 11, with which, when said switch contact member 16, is in contact, the motor is at rest with no current flowing therethrough.

The operation is as follows:

When the switch arm 13, is adjusted into a position such that the resilient contact member 16, thereof, bears upon the contact member 23, of the switch insulating member 11, within the casing, the motor is at rest. Upon slight movement of said switch arm to bring the same into contact with the first terminal 12 current passes through the switch and through the wire 22, through both of the resistance coils 17, thence through the field coils 5, through one of the brushes and armature of the motor leaving by the other brush and through the field coils 6, to complete the circuit through the motor.

Another adjustment of said switch arm 13, to the next adjacent position on the next contact 12, establishes a circuit through the wire 21, and only one of the resistance coils 17, thus reducing the resistance in circuit with the motor so that the motor receives more current and operates at a higher speed. Shifting of the arm 13, into the third or last position serves to establish the circuit directly through the field coil 5, cutting out the resistance coils thus further increasing the speed of the motor. It is apparent therefore that the motor is capable of being operated at three different speeds.

The arrangement affords an exceedingly compact assembly of the parts, and the mechanisms are all concealed within the casing of the motor. The variations in speed are readily obtained by utilizing the thumb for the purpose of actuating the finger piece 14, which moves the switch on the interior of the motor while the device is being used.

It is obvious that the resistance coils may be so arranged that not only is the resistance thereof taken into account, but the coils may be so numerous as to utilize the magnetic effect thereof to reduce the magnetic effect of the poles, so that a cumulative effect for reducing the speed of the motor is obtained to-wit; introducing resistance into the circuit and decreasing the magnetic flux of the poles.

I am aware that various details of construction may be varied through a wide range without departing from the principles of my invention, and I therefore do not purpose limiting the patent granted otherwise than necessitated by the prior art.

I claim as my invention:

In a series motor the combination with the field coils, armature, armature shaft and armature winding in series with the field coils, of resistance coils in series with the field coils and wound together with one of the sets of field coils and switch mechanism comprising a fixed plate of insulating material, a series of contact points thereon each connected to one of said resistance coils, a quadrant electrically connected to the field coils attached at its ends to said insulating plate and spaced therefrom at intermediate points, a switch arm pivotally mounted co-axial with the armature shaft of the motor, and a bifurcated spring contact on said switch arm extending between the quadrant and said plate, one arm of which spring contact bears against one or other of the contact points while the other arm bears against the underside of the quadrant thereby electrically connecting the contact point to the quadrant.

In testimony whereof I have hereunto subscribed my name in the presence of two subscribing witnesses.

CHARLES ENDORF, Jr.

Witnesses:
CHARLES W. HILLS, Jr.,
EARL M. HARDINE.